United States Patent [19]
Guntersdorfer

[11] 3,760,203
[45] Sept. 18, 1973

[54] DEPOLARIZATION PROTECTION FOR CERAMIC PIEZOELECTRIC MOTOR

[75] Inventor: Max Guntersdorfer; Peter Kleinschmidt, both of Munich, Germany

[73] Assignees: Siemens Aktiengesellschaft; Braun AG, both of Frankfurt, Germany, by said Guntersdorfer

[22] Filed: Feb. 22, 1972

[21] Appl. No.: 228,085

[30] Foreign Application Priority Data
Feb. 25, 1971 Germany.................. P 21 09 063.1

[52] U.S. Cl..................... 310/8.1, 310/8.5, 310/8.6, 310/9.5
[51] Int. Cl............................................. H01v 7/00
[58] Field of Search...................... 310/8.1, 8.5, 8.6, 310/8.2

[56] References Cited
UNITED STATES PATENTS
| | | | |
|---|---|---|---|
| 3,639,788 | 2/1972 | Horan | 310/8.1 |
| 3,500,089 | 3/1970 | Brech et al. | 310/8.1 |
| 3,657,874 | 3/1972 | Imahashi | 310/8.1 X |
| 3,336,529 | 8/1967 | Tygart | 310/8.2 X |

Primary Examiner—J. D. Miller
Assistant Examiner—Mark O. Budd
Attorney—Carlton Hill et al.

[57] ABSTRACT

A piezoelectric motor employs a bending strip or several bending strips having piezoelectric ceramic elements which are mechanically connected in parallel in a single or several packages wherein each bending strip undergoes bending or torsional deformation upon the application of an alternating electrical voltage applied to one or several electrode pairs carried by the ceramic bending strip. The direction of the voltage reverses from between the same direction and the direction opposite to that of the permanent polarization of the ceramic material between the pair of electrodes and the motor includes a circuit comprising parallel connected rectifier and resistor elements connected in series with pairs of electrodes and having the rectifier poled with its forward direction opposite to that of the permanent polarization of the ceramic material and the resistor is dimensioned such that the peak voltage across a pair of electrodes does not exceed a predetermined fraction of the peak value of the applied alternating voltage during the non-conducting phase of the rectifier.

7 Claims, 2 Drawing Figures

DEPOLARIZATION PROTECTION FOR CERAMIC PIEZOELECTRIC MOTOR

BACKGROUND OF THE INVENTION

1. Field of the Invention

This invention relates to a piezoelectrically excited motor in which a bending strip or several bending strips having piezoelectric ceramics therein are connected mechanically in parallel in one or several packages whereby each bending strip carries out bending and/or torsional deformations upon the application of an alternating electric voltage to one or several electrode pairs carried by the ceramic material and wherein the voltage, at times, is in the same direction or in an opposite direction with respect to the permanent polarization of the ceramic material between pairs of electrodes.

2. Description of the Prior Art

It is well known in the art to provide a piezoelectric bending oscillator for driving a striker of a bell. Further, it is known to utilize the output of a piezoelectrically excited tuning fork as means for driving a time piece. In addition, German Pat. 1,906,947 describes a piezoelectric motor which utilizes a bending strip having a piezoelectric ceramic.

In U.S. Pat. application Ser. No. 179,449, filed Sept. 10, 1971, a piezoelectric motor is disclosed which employes several piezoelectrically excitable bending strips arranged parallel and adjacent one another and mechanically connected in parallel with respect to each other as a single package between a part which is to be moved and another, preferably fixed, part of the motor. The bending strips essentially consist of carrier strips lined with strips of piezo-ceramic material and are clamped together at spaced apart mounting places.

In another application, (Attorneys Docket No. 72053) a motor is described in which a power or efficiency increase, respectively, can be obtained through the utilization of a piezoelectric motor which utilizes mechanical techniques, particularly firm and rigid mounting which supports on the entire mounting surface and/or by means of two or more mountings of the bending strips.

Embodiments of bending strips may include one or more strips of piezoelectric ceramic material connected to a non-piezoelectric carrier strip.

Other embodiments of bending strips include those in which two strips of piezoelectric ceramic material are connected with each other and are excited to carry out opposite phase contractions and dilatations so that when electric voltages of suitable polarity are applied between electrodes on the ceramic strips bending movements of the composite strip will result. A piezoelectrically non-active carrier strip, in particular a strip of metal material, may be provided, as is well known, in the center between the ceramic material.

In the above identified application (Docket No. 72053) embodiments are disclosed in which a single bending strip is designed and excited in such a way that one or more S-shaped bending movements result. Heretofore, such a strip has been polarized, with respect to its longitudinal direction, in sections with opposite polarity from section to section with an alternately directed electrical voltage. The excitation is effected by means of applying an electrical voltage between two electrodes, respectively, which are arranged on opposite sides of the ceramic strip and which together form an electrode pair, respectively. Several electrode pairs may therefore share a common electrode.

SUMMARY OF THE INVENTION

It is the primary object of this invention to provide increased power or efficiency in a piezoelectric motor, in particular as such a motor has been disclosed in one or both of the foregoing patent applications, and in particular with respect to equal geometric dimensions and/or essentially unchanged construction of the motor.

It is also an object of this invention to obtain a decrease in the number of bending strips utilized in the motor for a given power or efficiency requirement and therefore obtain a decrease in the size of the motor.

The above objects are realized according to the present invention through the provision of a piezoelectric motor of the general above described character which utilizes a combination of a rectifier and a resistor connected electrically in parallel therewith, the combination being connected electrically in series with an electrode pair with the rectifier poled in such a way that its forward or pass direction is electrically opposite to the direction of permanent polarization of the ceramic material between the respective electrode pair and the resistance is of a value such that the peak voltage between an electrode pair does not exceed a predetermined fraction of the peak voltage of the applied alternating wave during the blocking phase of the rectifier.

With a bending strip having two interconnected strips made of piezoelectric active ceramic which contracts or dilates, respectively, is excited out of phase with respect to the polarization of the ceramic strips, at least in a certain length of the strip. Two rectifiers are provided, according to this invention, each having a parallel connection resistor. One of these rectifier-resistor combinations is connected in series with the electrode pair of one of the ceramic strips and the other combination is connected in series with the electrode pair of the other ceramic strip.

BRIEF DESCRIPTION OF THE DRAWING

Other objects, features and advantages of the invention, its organization, construction and operation will be best understood from the following description of a preferred embodiment of the invention taken in conjunction with the accompanying drawing, in which.

DESCRIPTION OF THE PREFERRED EMBODIMENT

Figure 1:
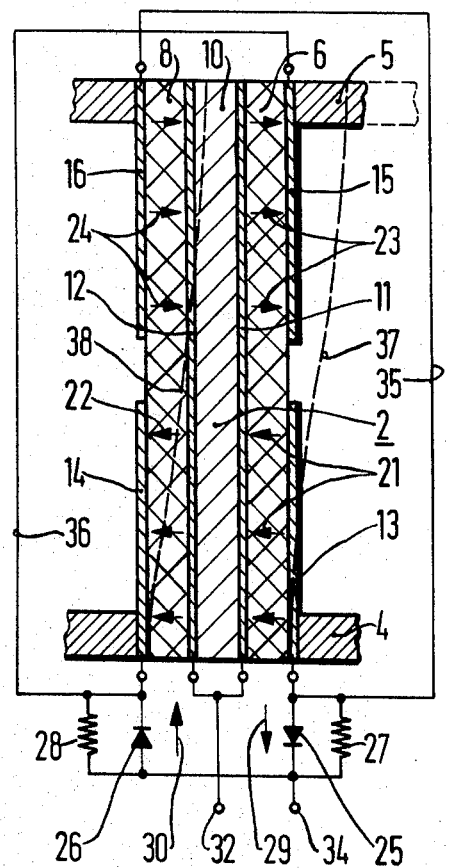
FIG. 1 is a fragmentary sectional elevational view of a piezoelectric motor constructed in accordance with the principles of the present invention.

Referring to FIG. 1, a bending strip 2 has one end thereof securely mounted in a mounting device 4 and the other end thereof securely mounted in a mounting device 5. The mounting device 4 is preferably fixed, while the mounting device 5 is free to oscillate. Particularly preferred embodiments for such mountings are described, in particular, in the aforementioned patent application (Docket No. 72053). It should be noted that for purpose of illustration, the device of FIG. 1 is exaggerated in the direction of the thickness of the strip 2.

The bending strip 2 which has been represented as an example in FIG. 1, essentially comprises a pair of strips 6 and 8 constructed of piezo-ceramic material which are securely connected to each other. For this connection, gluing or spot soldering has been provided.

According to a particularly preferred embodiment, the bending strips have a carrier strip 10 interposed between the piezo-ceramic strips 6 and 8. The carrier strip 10 is preferably made of metal and carries the neutral zone of a bending strip. In the case of an electrically conductive carrier strip, the carrier strip is advantageously also utilized as an electrical connection. If the piezo-ceramic strips 6 and 8 are connected with this carrier strip with the help of an electrically insulating agent, such as electrically non-conductive glue, further electrical coatings 11, 12 are provided on the sides of the piezo-ceramic strips 6 and 8 which are facing each other, and particularly these coatings 11, 12 are applied directly on the surface of the ceramic material for direct electrical connection of the exciting voltage which is to be provided to the piezo-ceramic strips 6 and 8. These electrode coatings 11, 12 are electrically connected with each other, or within the interior of the device by the electrically conductive carrier strip, respectively, in any suitable manner, for example by means of a point of conductive glue.

Additional electrodes 13, 14, 15 and 16 are, for example, arranged on the outer surfaces of these piezo-ceramic strips 6 and 8. The bending strip 2 which has been illustrated in FIG. 1 in order to explain the invention thus has the electrode pairs 11–13, 11–15, 12–14 and 12–16. The division into the electrode pairs 11–13 and 11–15 or 12–14 and 12–16, respectively, in the longitudinal direction of the bending strip 2 is provided in order to produce the desired S-shaped bending movement of the bending strip between its two mounted ends.

The arrows 21, 22, 23 and 24 which have been inserted in the longitudinal sectional surfaces of the piezo-ceramic strips 6 and 8 indicate the directions of the permanent polarization in the piezoelectric ceramic material of the strips 6 and 8 which may, for example, be selected for a bending strip which bends in an S-shaped manner and which is mounted at both ends, as illustrated in FIG. 1. The permanent polarizations are, as is well known, caused by a polarization process.

According to this invention, two rectifiers 25 and 26 are provided for the illustrated bending strip with electrical resistors 27 and 28 respectively connected in parallel therewith. A combination of the rectifier 25 and the resistor 27 is connected in series with the electrode pairs 11–13 and 12–16, which are connected in parallel. The other combination of the rectifier 26 and the resistor 28 is connected in a similar manner with the electrode pairs 11–15 and 12–14. According to a preferred embodiment of the invention, these two series connections are again connected in parallel and connected with the terminals 32, 34 for receiving an excitation voltage from a suitable electrical supply.

According to this invention, the rectifiers 25 and 26 are respectively poled such that the forward direction of the individual rectifiers, indicated in FIG. 1 by the respective arrows 29 and 30, is directed opposite to the direction of polarization of the ceramic material between the electrode pairs which are connected in circuit with the respective rectifiers. The electrical connections which are provided for connecting the respective upper electrode pairs are schematically shown and referenced 35 and 36.

The effect of an arrangement as set forth above according to the principles of this invention is as follows. When an electric alternating voltage is applied to the terminals 32 and 34, for example from a commercial supply of 220 volts, different high values of peak voltage will occur in both phases of the alternating wave due to the rectifier 25 which blocks in one direction. The same is analogously valid for the electrode pairs 11–15, 12–14 and 12–16. If the charge current of the capacitance between the individual electrode pairs flows in the forward direction of the rectifier connected in series therewith, the voltage between the electrodes increases up to a value near the peak value of the alternating wave applied across the terminals 32 and 34. With a polarity of the voltage which is respectively the inverse polarity, i.e. in the blocked condition of the rectifier, the rectifier will block and the charging current, according to the invention, essentially only flows through the parallel connected resistor. The resistor is selected in accordance with the value of capacitance between the parallel connected electrode pairs, in particular and according to the invention, in such a way that the peak voltage across the electrode pairs remains a predetermined amount below the peak value of the applied voltage in this phase. The magnitude of the resistor essentially depends on the entire capacitance in series with the respective rectifier. In the examples set forth in FIG. 1, this is the entire capacitance of the electrode pairs 11–13 and 12–16, or the electrode pairs 12–14 and 11–15. Furthermore, this value depends on the frequency of the applied voltage.

In accordance with the above selection of components in practicing this invention and in accordance with the forward direction of the individual rectifiers with respect to the direction of permanent polarization of the ceramic material between the respectively associated electrode pairs, it is provided that during the portion of the electric field established by the alternating wave which is operating oppositely to the permanent polarization, the field strength reaches only such a predetermined value which does not yet have a depolarizing effect on the ceramic material, even during unfavorable operational conditions. In particular, a strong heating of the ceramic material is to be regarded as an unfavorable operational condition.

In the phase of the electric field in which the field strength due to the exciting voltage is operating in assistance to the permanent polarization of the ceramic, however, the field strength can be made to increase to values which are determined merely by the available magnitude of the applied alternating wave and/or by the electric disruptive strength and conductivity of the ceramic material. In this phase, a correspondingly particularly high operational efficiency of the motor can be obtained. The thickness of the ceramic strip is selected in accordance with the magnitude of the peak value of the available excitation voltage.

Disregarding the power or efficiency increase which is obtained according to this invention, the present invention also teaches the provision of decreasing the heat loss occurring in the ceramic. By means of lowering in the magnitude of the depolarizing field strength, the amount of domain movements which occur and which supply an essential portion of the heat loss produced in the ceramic will be lowered.

The parallel connection of the electrode pairs 11-15, 12-16 on the one hand and the electrode pairs 12-14 and 11-14 on the other hand, as illustrated in FIG. 1, takes into account the above-mentioned S-shaped bending movement which is to be executed by the illustrated bending strip.

The S-shaped bending movement is indicated in phantom in FIG. 1 by the broken lines 37, 38 for one phase of the applied alternating wave. The electrodes 13 and 15, or 14 and 16, extend along the sides of the ceramic material and terminate near the turning or nodal point of the strip. If a complete bending of the strip is required in each direction which is equal for each phase of the applied voltage, the entire bending strip may be constructed in such a way as is described for the lower or the upper half of the bending strip as illustrated in FIG. 1.

The distribution of the outer electrodes 13, 14, 15 and 16 as shown in FIG. 1, and the associated particular circuit of the electrodes is suitable, in particular, for bending strips of a piezoelectric motor as has been described in the aforementioned patent applications in which bending strips are arranged in a line as a single unit and mechanically connected in parallel, the individual bending strips being preferably securely mounted together at both ends.

Figure 2:
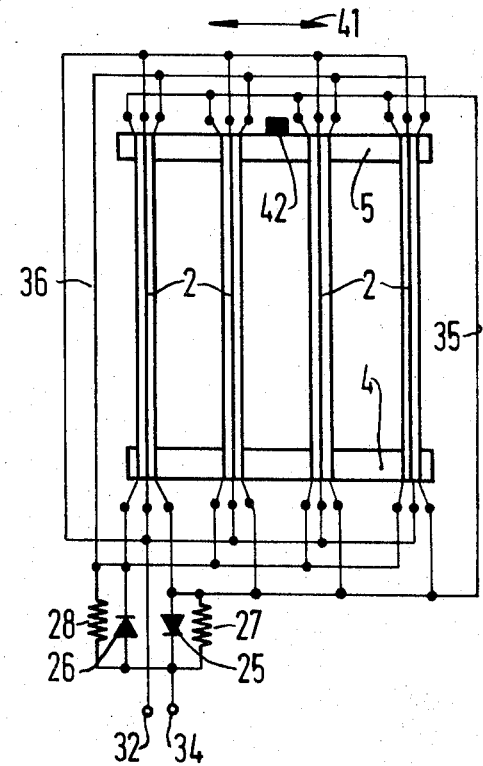
FIG. 2 is a schematic representation of a plurality of piezoelectric bending strips connected together in the manner illustrated in FIG. 1 to form a multi-strip piezoelectric motor.

FIG. 2 schematically illustrates, in principle, the drive unit of a piezoelectric motor which comprises four bending strips 2 mechanically connected in parallel and the associated input circuit for the individual electrodes which includes two rectifier resistor combinations 25, 27 and 26, 28 connected in accordance with the teachings of the present invention. The individual features which coincide with FIG. 1 have been illustrated in FIG. 2 and carry the respective reference numbers. When an electric alternating voltage is applied to the terminals 32 and 34, the drive unit illustrated in FIG. 2 carries out oscillatory movements during which the upper mounting device 5 moves back and forth, essentially in a straight line, with respect to the lower mounting device 4 of the bending strips 2. This is indicated by means of the two-headed arrow 41. With a mechanical fixation of the lower mounting device 4, mechanical work can be obtained, for example, at the stud 42 carried on the mounting device 5. The electrical connections of the electrode pairs have not been illustrated in detail in FIG. 2, but can be taken from the circuit illustrated in FIG. 1.

In an electric dry shaver, for example, the shaving head or the lower knife can be connected to the stud 42 and the shaver would therefore be driven by the above described motor utilizing the movements of the piezoelectrically excited bending strips. Further individual features concerning the application of such a piezoelectric motor for a dry shaver have been described in greater detail in the aforementioned patent applications. It should, however, be noted that there are other applications of the piezoelectric motor as a drive for other devices, for example other devices for cosmetic care of the body such as may be used in the care of the nails or for providing a massage.

Although I have described my invention with reference to specific illustrative embodiments, changes and modifications of my invention may become apparent to those skilled in the art without departing from the spirit and scope of my invention. It is therefore to be understood that I intend to include within the patent warranted hereon all such changes and modifications as may reasonably and properly be included within the scope of my contribution to the art.

I claim:

1. In a piezoelectric motor of the type having at least one piezoelectrically excitable polarized ceramic bending strip carrying at least one pair of electrodes for receiving an alternating voltage from an electrical supply and mounted at its ends in mounting devices of which one is to reciprocate, the improvement therein comprising an input circuit including a rectifier, and a resistor connected in parallel with said rectifier, said parallel connected rectifier and resistor connected in series with the electrodes of said one bending strip with said rectifier poled opposite to the direction of polarization of said ceramic strip between said electrodes and said resistor having a value to limit the peak voltage applied across said ceramic strip during blocking operation of said rectifier to a predetermined fraction of the peak voltage received from the electrical supply.

2. The improvement set forth in claim 1, further defined wherein said bending strip comprises an elongate carrier strip, a pair of elongate ceramic elements secured to opposite sides of said carrier strip, a plurality of pairs of electrodes including said one pair of electrodes, said plurality of electrodes including four individual electrodes connected to and extending from the ends of said ceramic strips toward the opposite ends and a pair of elongate electrodes interposed and connected between said carrier strip and respective ones of said ceramic elements, each said elongate electrode being included in an electrode pair with the two of said four individual electrodes connected to the same ceramic element, said ceramic elements polarized in a first direction between its one pair of electrodes and in an opposite direction between its other electrode pair, said elongate electrodes electrically connected and adapted for connection to the electrical supply, and wherein said input circuit comprises a second rectifier and a second resistor connected in parallel therewith, and having a resistance value similar to that of the first-mentioned resistor, each of the rectifier-resistor combinations serially connected with two pair of said electrode pairs of separate ones of said ceramic elements and poled opposite to the direction of polarization of said ceramic elements between the respective pairs of electrodes, said rectifiers connected together and adapted for connection to the electrical supply.

3. The improvement set forth in claim 1, wherein said polarized ceramic bending strip includes a plurality of pairs of electrodes for receiving an exciting voltage and is permanently polarized so that the exciting voltage is alternately in the direction of polarization for one pair of electrodes and in an opposite direction for another pair of electrodes.

4. The improvement set forth in claim 1, wherein said bending strip comprises two mechanically interconnected ceramic strips each having at least one pair of electrodes.

5. The improvement set forth in claim 1, wherein said bending strip comprises two mechanically interconnected ceramic strips, two pairs of electrodes on one of said ceramic strips spaced in the longitudinal direction thereof, two other pairs of electrodes on the other ceramic strip spaced in the longitudinal direction thereof, and a second rectifier-resistor combination, each of said rectifier-resistor combinations connected in series with respective ones of said pairs of electrodes.

6. The improvement set forth in claim 1, comprising a plurality of pairs of electrodes, said electrodes carried on each side of said bending strip and spaced apart longitudinally of said bending strip and adapted for application of opposite polarities of voltages to produce S-shaped bendings.

7. The improvement set forth in claim 1, comprising a plurality of said bending strips having respective pairs of electrodes mechanically connected in parallel and electrically connected to said input circuit in the same manner as the first mentioned bending strip.

* * * * *